(12) United States Patent
Jackman

(10) Patent No.: US 9,849,901 B2
(45) Date of Patent: Dec. 26, 2017

(54) CONTAINER WITH POWER ASSIST WHEELS

(71) Applicant: Dane Jackman, Miami Beach, FL (US)

(72) Inventor: Dane Jackman, Miami Beach, FL (US)

(*) Notice: Subject to any disclaimer, the term of this patent is extended or adjusted under 35 U.S.C. 154(b) by 7 days.

(21) Appl. No.: 14/848,261

(22) Filed: Sep. 8, 2015

(65) Prior Publication Data

US 2016/0229437 A1 Aug. 11, 2016

Related U.S. Application Data

(60) Provisional application No. 62/047,628, filed on Sep. 8, 2014.

(51) Int. Cl.
| | |
|---|---|
| B62B 5/00 | (2006.01) |
| H02P 7/28 | (2016.01) |
| B65D 81/38 | (2006.01) |
| B62B 1/24 | (2006.01) |
| B62B 5/06 | (2006.01) |
| H02P 7/298 | (2016.01) |

(52) U.S. Cl.
CPC .............. *B62B 5/0073* (2013.01); *B62B 1/24* (2013.01); *B62B 5/0033* (2013.01); *B62B 5/065* (2013.01); *B65D 81/3813* (2013.01); *H02P 7/28* (2013.01); *H02P 7/2985* (2013.01)

(58) Field of Classification Search
CPC ....... B62B 5/0073; B62B 1/24; B62B 5/0033; B65D 81/3813
See application file for complete search history.

(56) References Cited

U.S. PATENT DOCUMENTS

| | | | | |
|---|---|---|---|---|
| 4,932,677 | A * | 6/1990 | Shustack | A45C 5/14 280/28.5 |
| 5,407,218 | A * | 4/1995 | Jackson | A45C 5/14 280/30 |
| 5,657,828 | A * | 8/1997 | Nagamachi | B60L 11/1805 180/168 |
| 5,732,786 | A * | 3/1998 | Fujigaki | A61G 5/045 180/19.3 |
| 6,276,219 | B1 * | 8/2001 | Kube | B60L 15/20 73/862.391 |
| 6,276,471 | B1 * | 8/2001 | Kratzenberg | B60L 11/18 180/19.1 |
| 6,318,740 | B1 * | 11/2001 | Nappo | B62B 3/00 280/47.35 |
| 6,422,747 | B2 * | 7/2002 | Akutsu | A61B 6/467 180/19.1 |
| 6,502,656 | B2 * | 1/2003 | Weiss | A45C 5/14 180/168 |
| 6,871,715 | B1 * | 3/2005 | Diaz Carmena | B60L 11/1805 180/65.51 |

(Continued)

*Primary Examiner* — Joseph M Rocca
*Assistant Examiner* — Michael R Stabley
(74) *Attorney, Agent, or Firm* — Law Offices of F. M. Douglas, Esq.

(57) ABSTRACT

The present invention relates to a structure which may include an outer housing, an inner lining, an insulation space in between, a top, an inner platform, a charging station, a wireless charging panel, power-assist wheels with intelligent torque control for transport, a storage compartment, a removable innner liner, and a handle. The structure may comprise a portable container, such as an insulated cooler for storing cooled food and beverages for social and leisure activities.

29 Claims, 11 Drawing Sheets

(56) References Cited

U.S. PATENT DOCUMENTS

| | | | | |
|---|---|---|---|---|
| D516,869 S | * | 3/2006 | Beal | B62B 3/001 |
| | | | | D21/423 |
| 7,347,100 B2 | * | 3/2008 | Murakami | G01L 5/22 |
| | | | | 414/4 |
| 7,798,886 B1 | * | 9/2010 | Williamson | B62D 51/007 |
| | | | | 446/456 |
| 7,806,552 B1 | * | 10/2010 | St. Julien | A45C 15/06 |
| | | | | 362/154 |
| 8,327,961 B2 | * | 12/2012 | Arpino | B62B 3/001 |
| | | | | 180/19.1 |
| 8,672,081 B2 | * | 3/2014 | Kume | B62B 5/0026 |
| | | | | 180/19.1 |
| 8,706,332 B2 | * | 4/2014 | Kume | B62B 3/001 |
| | | | | 180/19.3 |
| 9,027,722 B1 | * | 5/2015 | Parker | A45C 5/14 |
| | | | | 190/102 |
| 9,278,704 B2 | * | 3/2016 | Cates | B62B 5/0089 |
| 9,462,796 B1 | * | 10/2016 | Ellis | A01K 97/22 |
| 2004/0238241 A1 | * | 12/2004 | Mitchell, Jr. | B62B 3/001 |
| | | | | 180/19.3 |

* cited by examiner

CONTAINER WITH POWER ASSIST WHEELS

CROSS-REFERENCE TO RELATED APPLICATION

This application claims priority from U.S. Provisional Patent Application No. 62/047,628, filed on Sep. 8, 2014, the contents of which are incorporated herein by reference.

BACKGROUND OF THE INVENTION

Several insulated coolers combine the cooler with electronic equipment, such as a radio, a media player, streaming media players, video displays, and other entertainment devices. Speakers may be integrated into the housing of the cooler. Coolers and electronic entertainment devices may be used as a significant part of outdoor recreational activities, including camping, picnicking, and similar activities. Unfortunately, portable containers are not usually used in locations near reliable electrical power supply sources. Thus, using an insulated cooler with various devices that consume power is problematic as electronic devices need to be charged frequently.

It is therefore desirable to provide a cooler that interfaces with electronic devices and easily provides charging capabilities.

As many electronic devices all use electricity but vary in the configuration of component charging cable connections (e.g., USB, micro-USB, Fire Wire, male connections, female connections, and the like), it is also desirable to provide a means for charging electronic devices independent of the physical shape of mating cables of various makes of electronic devices.

While many people carrying containers, such as insulated coolers, have the physical capability to transport such containers, whether by hand carrying, or by rolling with wheels, such coolers are becoming heavier. The weight of a cooler can increase with added components, such as electronics, motors, storage compartments, power supplies (such as batteries), speakers, charging panels, and even blenders. Additionally, some people, such as children, the elderly, or disabled people may need help transporting heavy containers.

To transport heavy containers, it would be desirable to have power assisted wheels that can control supplemental force to boost pushing or pulling of the container without removing complete control from the user.

Therefore, there is a need for a container transport control system which increases independence of users by providing sensors and a controller to reduce the amount of force required to operate a cooler or otherwise transport a cooler.

It would be advantageous to provide an apparatus, method, and system that would include one or more of the features of 1) wirelessly charging electronic devices using a power supply integrated or connected with the container; 2) providing supplemental power to wheels; 3) proportionally adjusting the power supplied to drive wheels based on user behavior; and 4) generating a control signal in proportion to the signal value if the signal value is above the threshold value.

SUMMARY OF THE INVENTION

Power-Assisted Wheels with Force Sensors:

In one aspect of the present invention, an insulated cooler may comprise an outer liner including a bottom panel, a front panel, a rear panel, a left side panel, and a right side panel, forming a generally rectangular structure; an inner liner within the outer housing, the inner liner including a front panel, a rear panel, a left side panel, and a right side panel, forming a generally rectangular structure; an insulation space in between the outer liner and the inner liner; a main lid for closing the insulated cooler; a personal storage compartment within the main lid and above a main cooler compartment of the insulated cooler; an inner platform above the main cooler compartment and below the personal storage compartment for separating the main cooler compartment from the main lid; a handle coupled to the rear panel of the outer liner; and a plurality of wheels coupled to the insulated cooler; a plurality of force-sensing sensors sensing pressure within the handle or on the insulated cooler body due to acceleration or deceleration, the force-sensing sensors generating a proportional signal in response to sensed pressure; a controller comprising at least one input for receiving the proportional signal and comprising logic to: determine a signal value form the proportional signal; determine whether the signal value is above a threshold value; determining a polarity of the signal value; generating a control signal in proportion to the signal value if the signal value is above the threshold value; and outputting the control signal to a motor controller for controlling at least one of the plurality of wheels.

Power-Assisted Wheels with Varying Handle Positions:

In another aspect of the present invention, an insulated cooler may comprise an outer liner including a bottom panel, a front panel, a rear panel, a left side panel, and a right side panel, forming a generally rectangular structure; an inner liner within the outer housing, the inner liner including a front panel, a rear panel, a left side panel, and a right side panel, forming a generally rectangular structure; an insulation space in between the outer liner and the inner liner; a main lid for closing the insulated container; a personal storage compartment between the top lid and a main cooler compartment of the insulated cooler; an inner platform above the main cooler compartment and below the personal storage compartment for separating the main cooler compartment from the main lid; a handle coupled to the rear panel of the outer liner; and a plurality of wheels coupled to the insulated cooler; a plurality of sensors sensing forces within the handle, the sensors generating a proportional signal in response to sensed forces; a controller comprising at least one input for receiving the proportional signal and comprising logic to: hold the handle in a neutral position by springs on sides of a center position; pull on the handle to shift the spring forces and move the handle from the center position and extending the handle; extend the handle to create a velocity command to a motor to increase speed; and push on the handle to compress the handle to create a command to decrease propulsion speed.

Wireless Charging:

In yet another aspect of the present invention, a container may comprise an outer liner including a bottom panel, a front panel, a rear panel, a left side panel, and a right side panel, forming a generally rectangular structure; an inner liner within the outer housing, the inner liner including a front panel, a rear panel, a left side panel, and a right side panel, forming a generally rectangular structure; an insulation space in between the outer liner and the inner liner; a main lid for closing the container; a personal storage compartment situated within the main lid and a main cooler compartment of the container; an inner platform above the main cooler compartment and below the personal storage compartment for separating the main cooler compartment from the main lid; a handle coupled to the rear panel of the outer liner; and a charging panel within the personal storage compartment for wirelessly charging electronic devices, such as during storage.

Removable Entertainment Modules, Such as Removable Wireless Stereo Speakers:

In still yet another aspect of the present invention, a container may comprise an outer liner including a bottom panel, a front panel, a rear panel, a left side panel, and a right side panel, forming a generally rectangular structure; an inner liner within the outer housing, the inner liner including a front panel, a rear panel, a left side panel, and a right side panel, forming a generally rectangular structure; an insulation space in between the outer liner and the inner liner; a main lid for closing the container; a personal storage compartment within the main lid and a main cooler compartment of the container; an inner platform above the main cooler compartment and below the personal storage compartment for separating the main cooler compartment from the main lid; a handle coupled to the rear panel of the outer liner; and an entertainment module removably attached to the container.

Removable Inner Container:

In a further aspect of the present invention, a container may comprise an outer liner including a bottom panel, a front panel, a rear panel, a left side panel, and a right side panel, forming a generally rectangular structure; an inner liner within the outer housing, the inner liner including a front panel, a rear panel, a left side panel, and a right side panel, forming a generally rectangular structure; an insulation space in between the outer liner and the inner liner; a main lid for closing the container; a personal storage compartment between a top lid and a main cooler compartment of the container; an inner platform above the main cooler compartment and below the personal storage compartment for separating the main cooler compartment from the main lid; a handle coupled to the rear panel of the outer liner; and a removable inner container nested within the container between the main lid and the bottom panel of the outer liner.

In a different embodiment of the present invention, a system for providing power assistance to wheels may comprise; a plurality of wheels coupled to at least one motor, a plurality of force-sensing sensors generating a proportional signal in response to sensed pressure, a controller comprising at least one input for receiving the proportional signal and comprising logic to; determine a signal value form the proportional signal, determine whether the signal value is above a threshold value, determining a polarity of the signal value, generating a control signal in proportion to the signal value if the signal value is above the threshold value, and outputting the control signal to a motor controller for controlling at least one of the plurality of wheels.

It should be understood that the power assist methods discussed herein may be useful and applicable to not only insulated coolers, but also to any object using wheels, such as luggage, crates, strollers, prams, wheelchairs, tool boxes, suitcases, heavy equipment, and other vehicles or objects using wheels. In a still different embodiment of the present invention, a system for providing power assistance to wheels may comprise; a plurality of wheels coupled to a vehicle, a handle coupled to the vehicle, a plurality of sensors sensing forces within the handle, the sensors generating a proportional signal in response to sensed forces, a controller comprising at least one input for receiving the proportional signal and comprising logic to: hold the handle in a neutral position by springs on sides of a center position, pull on the handle to shift the spring forces and move the handle from the center position and extending the handle, extend the handle to create a velocity command to a motor to increase speed, and push on the handle to compress the handle to create a command to decrease propulsion speed.

These and other aspects, objects, features and advantages of the present invention, are specifically set forth in, or will become apparent from, the following detailed description of an exemplary embodiment of the invention when read in conjunction with the accompanying drawings.

DETAILED DESCRIPTION OF THE INVENTION

Figure 1:
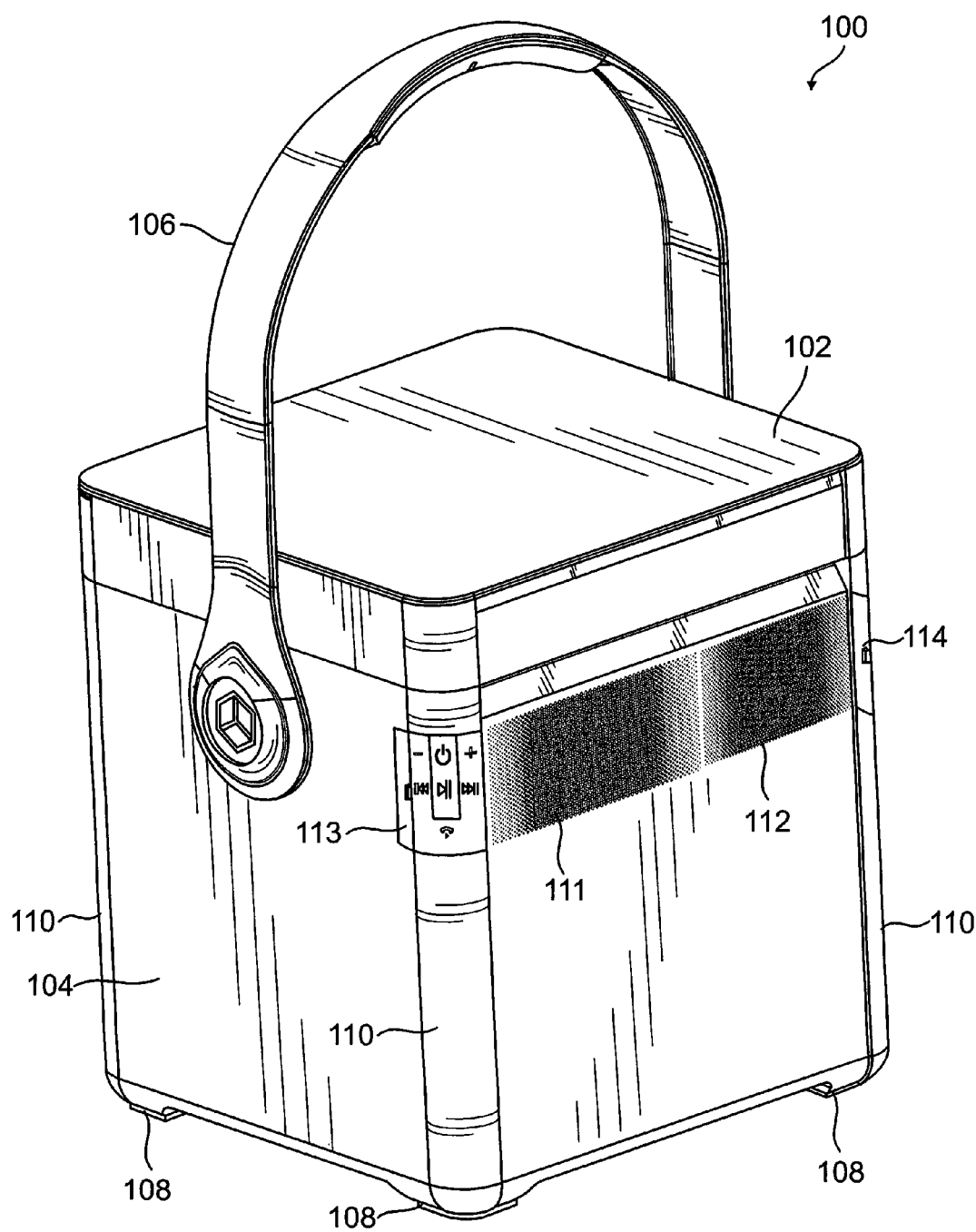
FIG. 1 is a perspective view, from above, of a cooler, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

A detailed description of one or more embodiments of the invention is provided below. The invention is described in connection with such embodiments, but the invention is not limited to any embodiment. The scope of the invention is not limited by the claims and the invention encompasses numerous alternatives, modifications and equivalents. Numerous specific details are set forth in the following description to provide a thorough understanding of the invention. These details are provided for the purpose of example and the invention may be practiced without some or all of these specific details. For the purpose of clarity, technical material that is known in the technical fields related to the invention has not been described in detail so that the invention is not unnecessarily obscured.

The present invention relates generally to portable containers, and in particular, to insulated coolers to carry food and beverages for social and leisure activities.

Several insulated coolers combine the cooler with electronic equipment, such as a radio, a media player, streaming media players, video displays, and other entertainment devices. Speakers may be integrated into the housing of the cooler. Unfortunately, portable containers are not usually used in locations near reliable electrical power supply sources. Thus, using an insulated cooler with various devices that consume power is problematic as electronic devices need to be charged frequently.

It is therefore desirable to provide a cooler that interfaces with electronic devices and easily provides charging capabilities.

As many electronic devices all use electricity but vary in the configuration of component charging cable connections (e.g., USB, micro-USB, Fire Wire, male connections, female connections, and the like), it is also desirable to provide a means for charging electronic devices independent of the physical shape of mating cables of various makes of electronic devices.

The present invention relates generally to a portable container, and more particularly to an insulated cooler, such as a portable personal music cooler.

Although the invention is often referred to herein as an insulated cooler, it is understood that such description is not limiting, such that the present invention may be implemented in various ways, including as a piece of furniture (e.g., an ottoman), an armrest, a console, a storage box, a desktop computer, or other suitable container. In general, the order of the steps of disclosed processes may be altered within the scope of the invention.

A portable container may be carried by hand or integrated (removably or permanently) in other items or structures, such as upon vehicles, furniture, or other suitable implementations. A portable container may also be fitted with wheels for rolling transportation along the ground, floor, or other surfaces.

A portable container may comprise an outer housing including a bottom panel, a front panel, a rear panel, a left side panel, and a right side panel, forming a generally rectangular structure; an inner lining structure within the outer housing, the inner lining structure including a front panel, a rear panel, a left side panel, and a right side panel, forming a generally rectangular structure; an insulation space in between the outer housing and the inner lining structure; a top for closing the portable container; a main storage compartment within the panels of the inner lining structure, the top closing the storage compartment; an optional inner platform on the storage compartment for separating the main storage compartment from the top; and a charging panel (removable or permanent) for wirelessly charging electronic devices.

The container may comprise a convenient removable interior liner for containing substances within the interior of the container, for easy cleaning and pre-cooling contents in a refrigerator or freezer, and other suitable uses. For audio output, such as music from media devices, Bluetooth™ speakers, optionally removable, may be installed. In one embodiment, two separate and integrated removable speakers may allow for pairing and stereo sound. For ease of carrying, a handle, such as a swivel strap, may be employed with an optional lid locking mechanism. The locking mechanism may engage with the strap when the strap is in a vertical position in relation to the base of the container. Any handle may be desired to be an ergonomic handle with padding. Rubber padding may be applied to legs on the container for cushioning support or other uses.

The container may comprise a main lid containing a personal storage compartment, attached to other portions by a hinge, such as a piano hinge. Portions of the container may be nested within each other. An outer liner may receive high density foam, such as for insulation purposes. An inner liner may nest within the container such that the insulating foam is situated within a space between the inner liner and the outer liner. The lid may be a retrofitable double lid.

Dividers may be used to prevent movement of contents or to isolate items. A personal storage compartment, such as within the main lid, may be used for mobile telephones, keys, wallets, flashlights, and such. The base of the personal storage compartment may house an integrated or removable wireless charging panel, mat, or other charging structure so that electronic devices may charge during storage within the container.

A cooler or other type of container may comprise a wheeled container for enhanced transportability, sometimes called a "power-assisted wheeled cooler." Some aspects may comprise oversized wheels (such as for all terrain environments), power-assisted wheels, cargo nets (or other suitable fabric material for extra storage), larger capacity compartments, cork screws, cutting boards, knives, bottle openers, removable wireless speakers, docking stations, telescoping handles, swivel handles, tie-down straps, and other useful features.

The container may comprise a cooler on wheels with a telescoping handle and a location (such as on a charging panel on the cooler) for wirelessly charging an electronic device, such as the iPod (trademarked by Apple, Inc.), the iPhone (trademarked by Apple, Inc.), the BlackBerry (trademarked by RIM, Inc.), the Android (trademarked by Google, Inc.), Android-based devices, and other portable devices. The cooler may feature a wireless charging area, such as a panel. Basically, a consumer may lay an electronic device, such as a smart phone, on a surface of the cooler for charging the battery of the electronic device. The charging may also occur wirelessly such that the electronic device is not connected by a cable or maybe even not touching any surface of the cooler, such as charging at a distance from the charging area of the cooler surface.

The charging functions of the invention may charge the portable electronic device from power supplied by the cooler's battery, from an entertainment module's battery, or other power supply, optionally plugged into an electrical outlet or an automobile electrical system. A wireless charging panel may be pre-charged, such as with a dedicated battery. Portable electronic devices may be charged from a Bluetooth™ speaker console.

A docking station or wireless entertainment console (such as a Bluetooth™ console) may serve as a Bluetooth™ receiver to communicate wirelessly with, say, a music player. The top of a portable container (such as an insulated cooler) may have a flat, non-slip surface for holding loose items, such as keys, phones, drinks, and such to keep them from slipping off the cooler top. Cup holder indentations or apertures may be present. A Bluetooth™ speaker may comprise a power button, a battery indicator, volume up/down controls and other controls or indicators may be present. The outer covering of a cooler compartment may include a plastic molded perforated section with a fabric backing to prevent sand or soil (for example) from slipping through the perforations, solid silicone plastic, or other useful components. Speakers may be located within the mesh, such as two 2-inch tweeters (or drivers) and two 4-inch woofers (or passive radiators), plus a two-channel amplifier. The base of the cooler may be elevated to reduce heat conduction involving the ground or other surface on which the cooler may rest. Some optional features may include a pull-out corkscrew, hidden handles, cargo net for storing items, a socket for a battery charger, and rugged oversized wheels (e.g., 8-inch wheels). Useful features may further include a raised section to prevent loose items from falling off of the cooler top, ample insulation, a seal gasket, a wheel axle, a removable access cover, and a recess for storing rechargeable batteries.

A charging panel (such as a removable and integrated charging panel), charging pad, or other structure may serve for wireless charging of electronic devices that are situated within, on, or near the container. The charging structure may receive RFID data from the electronic device in response to a request for RFID data or a connection. A compliance parameter may be sent to the electronic device. After communication between the charging structure and the electronic device commences, a coil array within the charging structure and/or the electronic device may be activated to charge the electronic device.

In an exemplary fashion, an interaction between the charging structure and the electronic device may proceed in a sequence not necessarily identical as described herein. An electronic device may be placed on, or near, a charging structure, such as a charging panel installed within the container. The charging panel may detect the presence of the electronic device. The charging panel may request data, such as RFID data, from the electronic device. The electronic device may send data to the charging panel. This data may be verified at the charging panel. The electronic device may open an NFC communication channel and request compliance parameters from the charging panel. The charging panel may send compliance parameters to the electronic device. At the mobile device, it may verify the compliance parameters sent from the charging panel. The electronic device may send an activation command to the charging panel. The charging panel may activate a coil array according to the command sent from the electronic device. The electronic device may monitor the wireless charging function and update the state of the electronic device. The electronic device may send a command to the charging panel to adjust a characteristic of the wireless charge. The charging panel may adjust the charging settings according to the activation command from the electronic device.

Referring to FIG. 1, a container (e.g., cooler) 100 is shown. A top lid 102 may be placed on top of the container 100. The main body 104 of the container 100 may have attached thereon a handle 106 for carrying the container, with feet 108 and corner panels 110 provided to enhance durability, structural integrity, ornamental appeal, and enhance ease of use.

A first entertainment module 111 may be mounted removable within the main body 104, with an entertainment control panel 113. A second entertainment module 112, such as for providing stereo features, may also be used, with its own entertainment control panel 114. The entertainment modules 111, 112 may each be a speaker, a radio, an audio streaming device, or any other suitable entertainment or information device. The entertainment modules 111, 112 may act as power banks or other suitable device to charge devices, including electronic device 124 (wirelessly, or wired connection). The entertainment modules 111, 112 may comprise drivers and a passive radiator, a water and dust resistant skin, a wireless interface component (e.g, Bluetooth™ communicator), and other useful components. The entertainment control panels 113, 114 may comprise volume controls, volume and power indicators (e.g., LED lights), wireless pairing indicator, ports (e.g., USB port for charge out, micro USB port for charge in, line in port, and a gasket for protecting the ports from entry of debris (e.g., sand from a visit to a beach).

Figure 2:
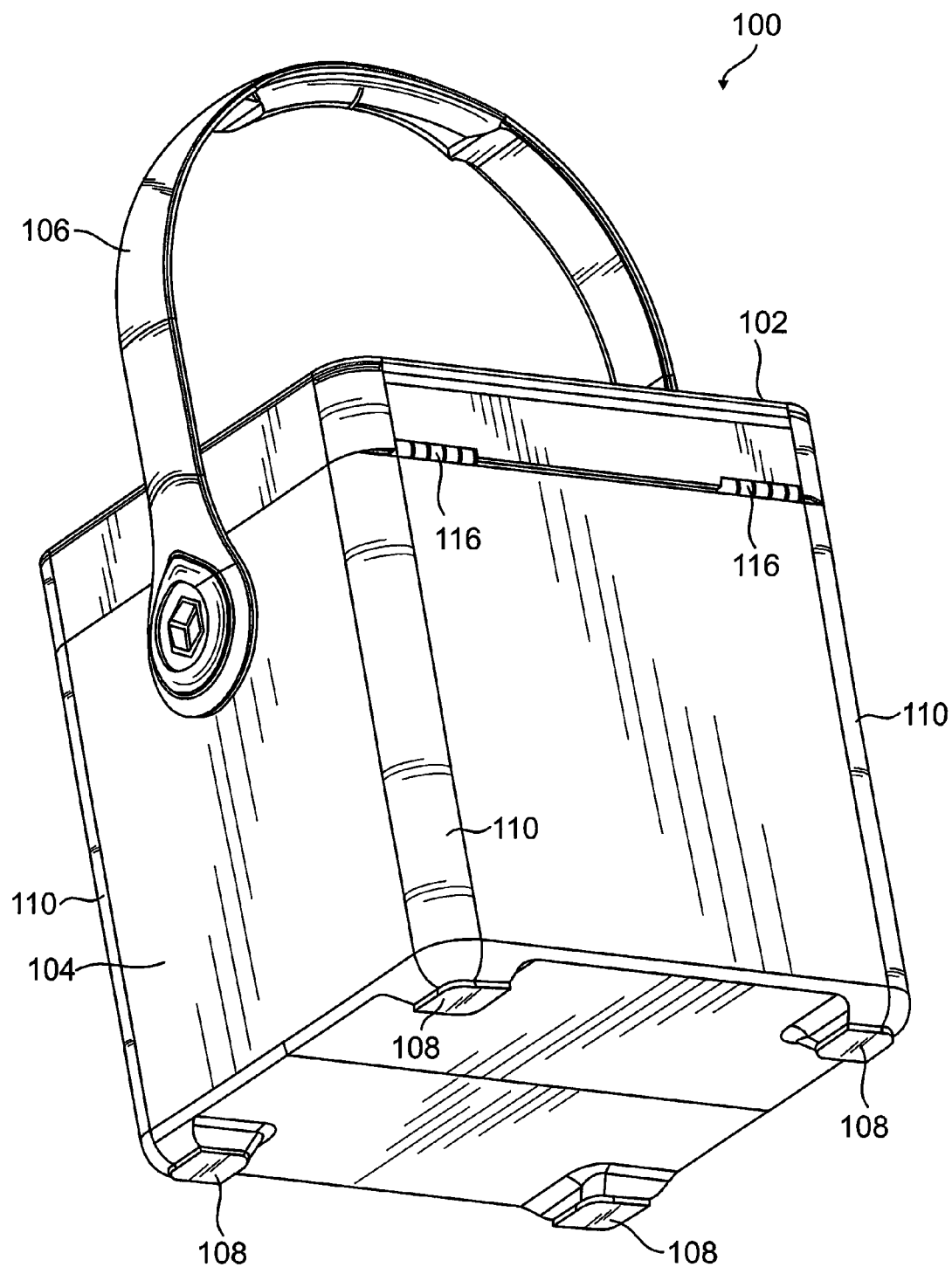
FIG. 2 is a perspective view, from below, of the cooler, shown in FIG. 1.

FIG. 2 is a perspective view, from below, of the reverse of the cooler, shown in FIG. 1. showing the hinges 116 for opening and closing the top lid 102 and the feet 108 for supporting the weight of the container 100.

Figure 3:
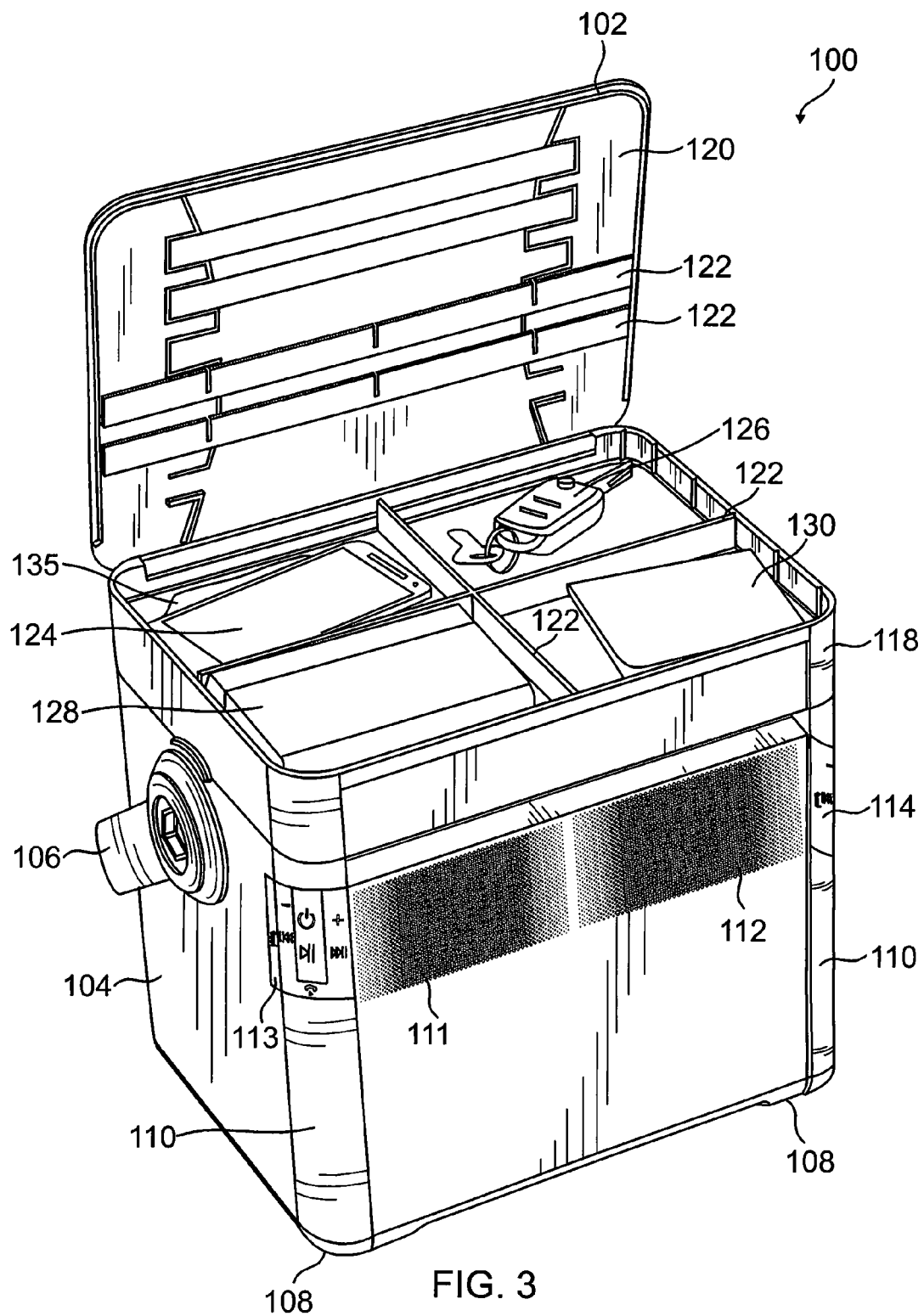
FIG. 3 is a perspective view of the cooler shown in FIG. 1, with the storage compartment lid open.

In FIG. 3 the cooler 100 from FIG. 1 is shown with the top lid 102 opened. Dividers 122 may be stored on the inside 120 of the top lid 102. Dividers 122 may be interchangeably inserted and removed from a personal storage compartment 118 to accommodate various personal items, such as an electronic device 124, keys 126, notebook 128, and documents 130. The electronic device 124 may be placed on top of or near to a charging panel 135. The charging panel 135 may be used to charge the battery or otherwise provide a power supply for the electronic device 124 even when the electronic device is at a distance from the charging panel 135. The dividers 122 may be used to create compartments and minimize movement of contents while carrying the container and when opening the top lid 102.

Figure 4:
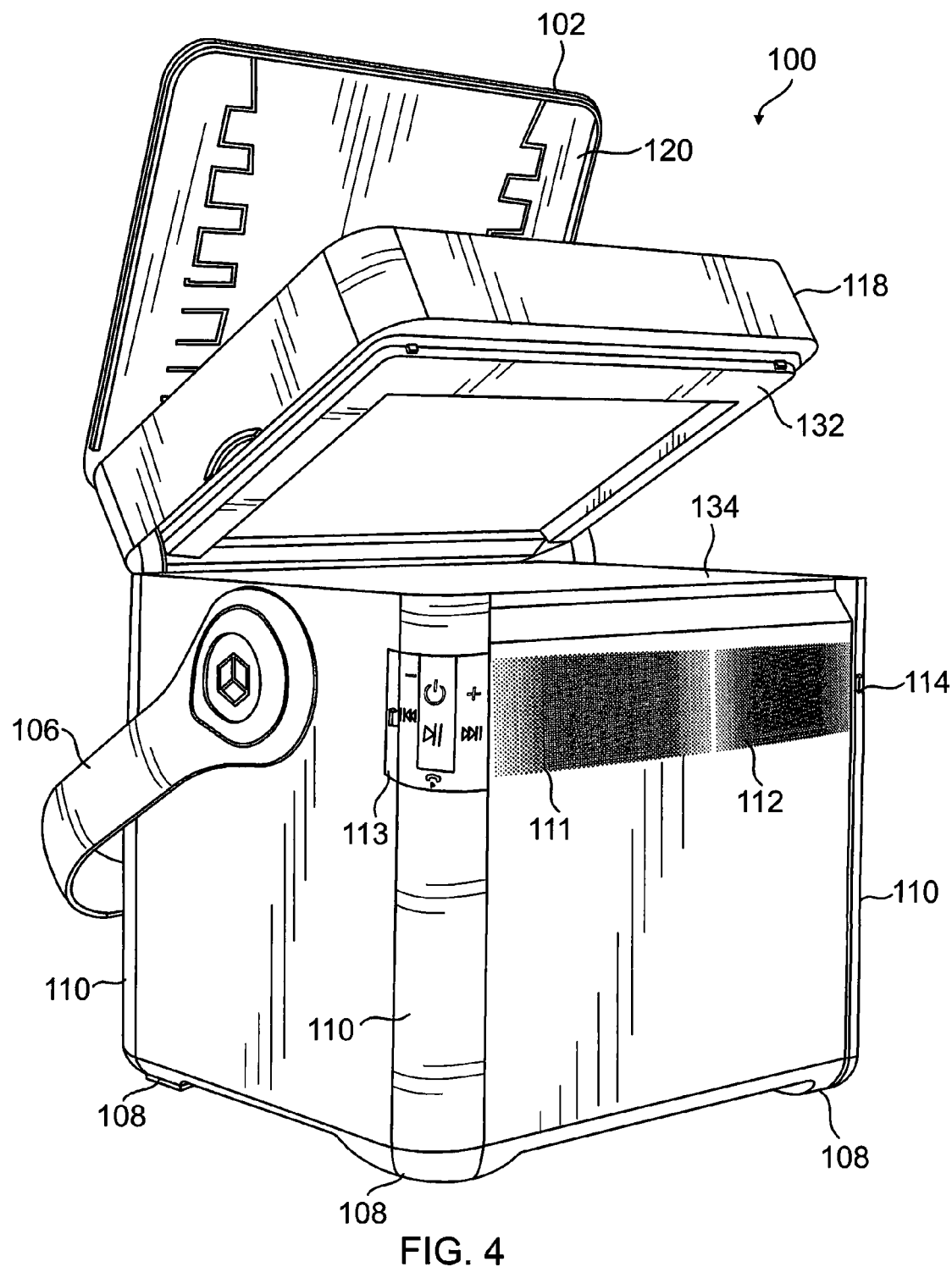
FIG. 4 is a perspective view of the cooler shown in FIG. 1, with the storage compartment lid (e.g., top lid) open and the main lid open.

The cooler shown in FIG. 1 is depicted in FIG. 4, with the main lid (containing the personal storage compartment) 118 lifted and the top lid 102 open. Lifting the main lid 118 enables access to main cooler compartment 134, where items may be stored, such as beverages, food items, ice, and other suitable items (not shown). A seal gasket or interior lid 132 may be attached to an underside of the personal storage compartment 118 to seal the main cooler compartment 134 to maintain cooler temperatures within the main cooler compartment 134.

Figure 5:
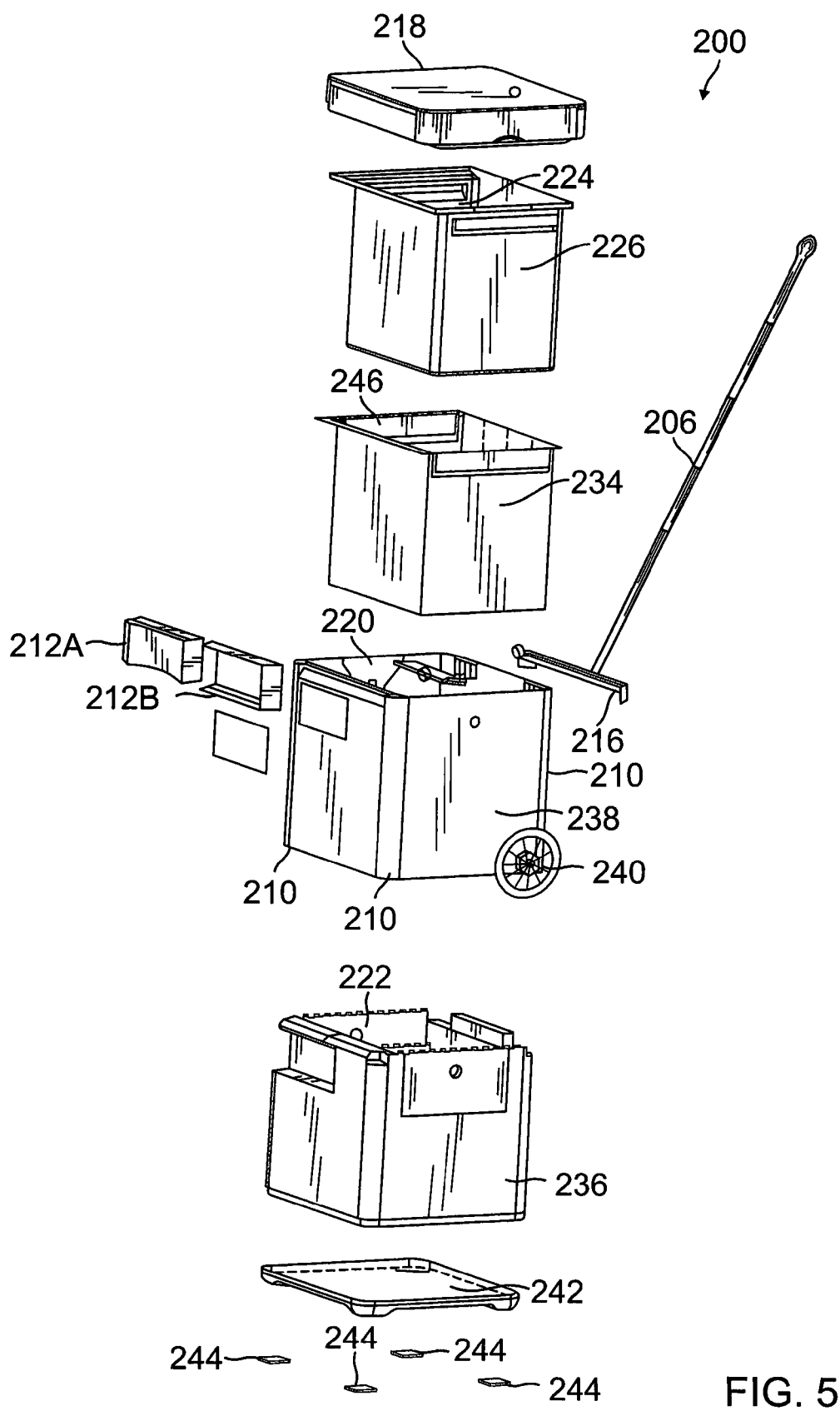
FIG. 5 illustrates an exploded view of a cooler, according to another embodiment of the present invention.

An exploded view of another embodiment of the present invention is shown in FIG. 5. The container 200 may comprise an outer liner 238 with an outer base 242, beveled corner panels, 210, and void 220 for receiving an optional insulating module 236, in turn with an opening 222 for receiving an inner liner 234. If the optional insulating module or other insulation material is not used, then the inner liner 234 may be inserted, for example, into void 220. A removable inner container 226 may be inserted into a void 246 in the inner liner 234, such as in a nesting relationship. The removable inner container 226 may be removed from the other portions of the container, filled with items (such as beverages, ice, food, and such), and placed to cool, such as in a freezer or refrigerator. Such a use may serve to pre-chill items, such as beverage containers, within the removable inner container 226 such that the items are already cool when inserted into a container before transporting the container 200, such as a cooler, outside. The inner removable liner 226 may also serve to contain spills or other waste from spreading to other portions of the container 200, such as electronic components. A pair of removable Bluetooth™ speakers 212A and speaker cavity cover tray 212B or other electronic devices may be inserted within the container 200. A handle 206 is shown as being attached to the outer liner 238. The handle 206 may be attached to the inner liner 234 and/or other components of the container 200. An opening 224 may serve for access to the interior compartment of the container 200. A main lid 218 may contain another interior personal storage compartment for storing items, being configured to open and close to allow access to the container 200 interior with hinge 216.

The container 200 may be transported with wheels 240, such as power assisted wheels as described herein. An outer base 242 may be adhered to a bottom of the container 200, optionally with non-slip pads 244 to avoid undesirable skidding movements.

Figure 6:
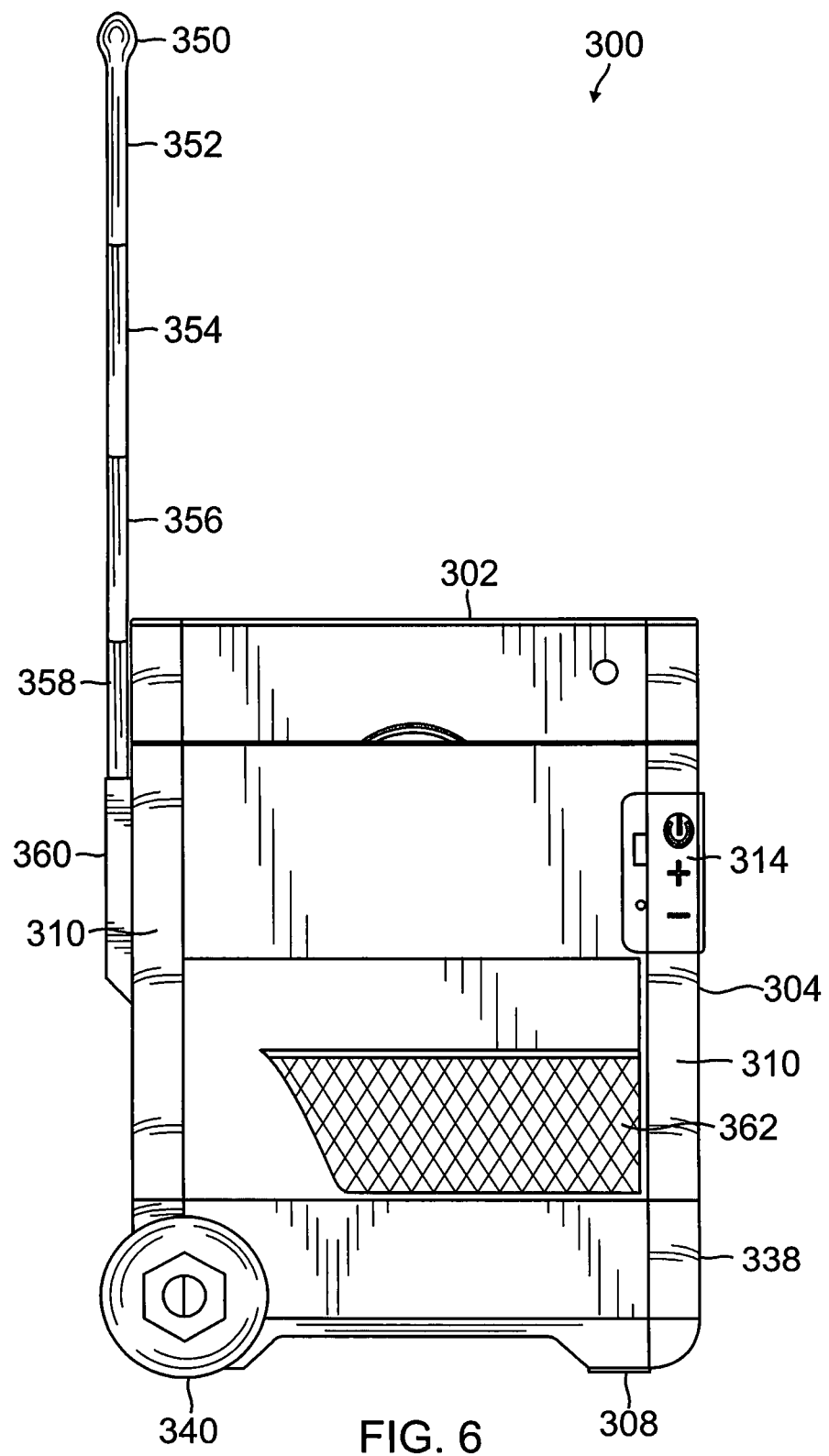
FIG. 6 a side view of a cooler, according to yet another embodiment of the present invention.
Figure 7:
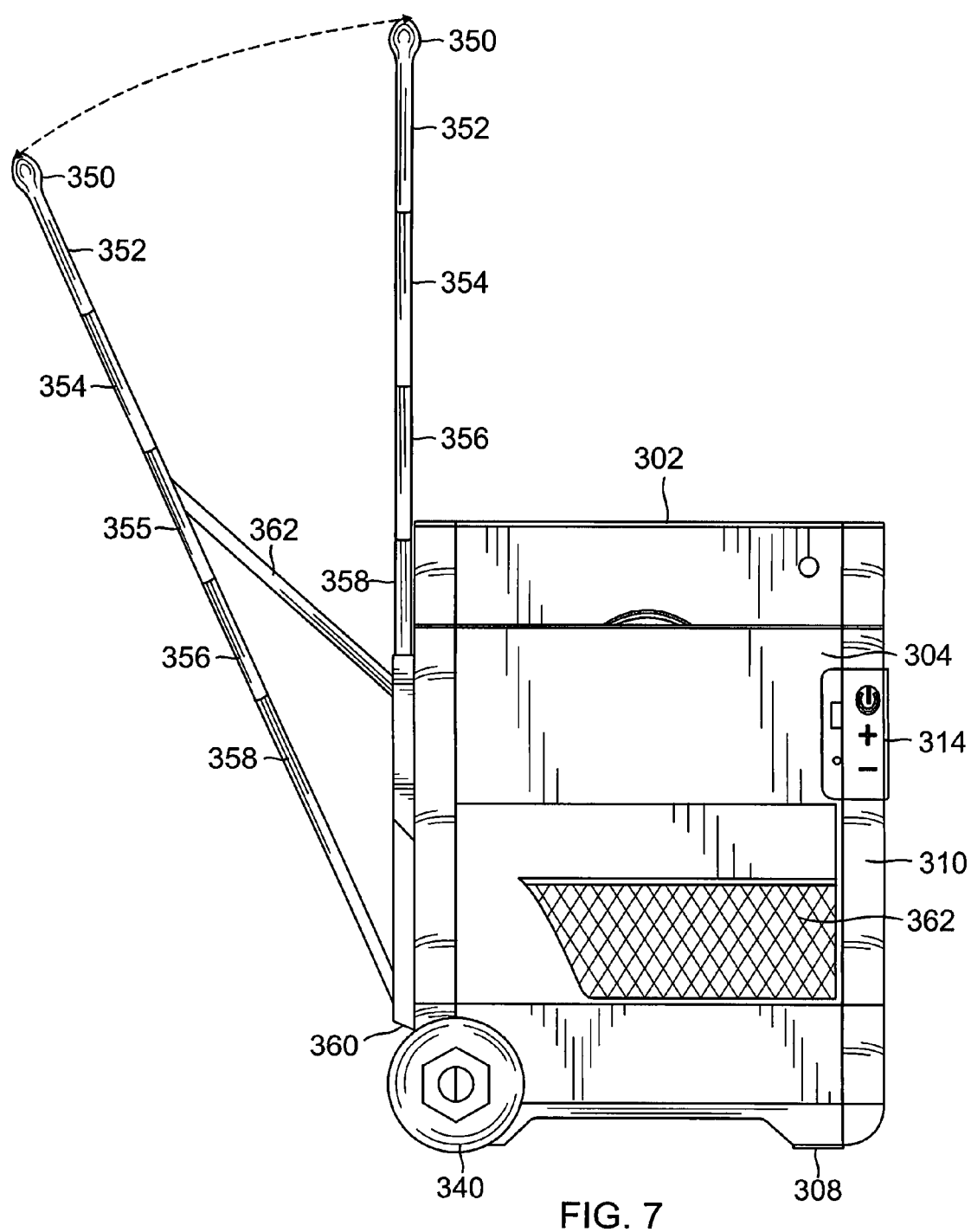
FIG. 7 a side view of a cooler, according to a still yet another embodiment of the present invention.

Another embodiment of the present invention is shown in a side view in FIG. 6. The container 300 (such as a cooler) may comprise a lid 302 (optionally with an interior storage compartment), a main module 304, and a removable electronic entertainment module 314, with feet 308 under a base portion 338. Beveled corner panels 310 may be situated at four corners of the main module. The container 300 may be transported by rolling wheels 340 and pulled or pushed with a telescoping handle 350, which may comprise various telescoping sections 352, 254, 356, 358. The telescoping handle 350 may serve to adjust in height for user comfort while transporting the container 300. The proximal telescoping section 358 may be attached to a side of the container 300 at attachment site 360. One or more cargo nets 362 or any other suitable fabric for storing items may be attached to one or more sides of the container 300 for storage of suitable items. FIG. 7 shows the container 300 of FIG. 6, with illustration of operation of the sliding or telescoping handle 350. The handle 350 may be held in a neutral position by springs on sides of a center position. Pulling on the handle 350 shifts the spring forces and move the handle 350 from the center position and extending the handle 350. Extending the telescoping handle 350 may create a velocity command to a motor to increase speed. Pushing on the handle 350 (such as when the cooler is moving faster than the user) may compress the handle 350 to create a command to decrease propulsion speed. In another embodiment, the handle 350 may be non-telescoping, but a swivel handle such that the handle 350 swivels up or down as needed for ease of pulling, pushing, or otherwise transporting and storage.

When the cooler moves in a fashion other than in a straight direction, curvilinear motion may become an issue, wherein one wheel is serves as an outside wheel and another wheel serves as an inside wheel. The outside wheel would tend to travel at a higher velocity than the inside wheel. The wheel speeds may be calculated in various manners. The radius of curvature may be calculated based on $$R=(mv^2)/F \qquad \text{Equation 1:}$$

Wherein
R=radius of curvature
m=mass of the cooler, including contents of the cooler
v=tangential velocity of the cooler
F=force normal to the curvature.

Another method may be used for calculating the radius of curvature when the total cooler mass is not readily determined. A mems gyroscope sensor or other suitable sensor may provide data on the angular velocity of the cooler. In that situation, one may calculate the radius of curvature based on $$R = \frac{v}{\omega} \qquad \text{Equation 2}$$

Wherein
R=radius of curvature
ω=angular velocity of the cooler
v=tangential velocity of the cooler.

After determining the radius of curvature to a centerline of the cooler and the angular velocity, through any useful method, one may calculate the tangential velocity for each wheel based on Equation 2. In one example, the wheels on the cooler are separated by three feet (approximately 14.2 cm), optionally considered as 1.5 feet (approximately 7.1 cm) from the centerline of the cooler. In this example, the correct wheel speed for the inside wheel may be determined:

$$V_{inside}=(R-1.5 \text{ feet})\omega$$

and the outsider wheel speed may be determined:

$$V_{outside}=(R+1.5 \text{ feet})\omega.$$

A support bar 362 may be connected to telescoping section 355 and to another telescoping section 352, 354, 356, 358 for ease of handling, such as when pulling or pushing the container 300. The telescoping handle 350 may pivot away from the container 300 in conjunction with the support bar 362 to help maintain a substantial portion of the center of mass of the container 300 directly above an axle of the wheel 340. As the contents, and thus mass, of the container 300 contents may vary (such as when items are removed or inserted) change, the container 300 may be more easily transported.

The present invention may involve self-powered wheels. The wheels 340 may be rubber wheels with motors to provide power assistance. Motors may be housed inside the wheels or in physical and/or electrical communication with the wheels to provide power. Various methods may be used to control power supplied to the wheels 340.

Power assist wheels may drive the cooler at an average velocity of the person pulling or pushing the cooler. A system may generate a velocity command for a control system based on a user's action, such as pulling on the handle of a cooler. Regarding linear velocity, when a user pulls on the handle, the system may measure the amount of pull force exerted on the handle. If the velocity of the cooler would exceed the walking speed of the user, a pushing force would be generated. The control system may be configured to zero out the various forces. An error signal may result from any non-zero force on the handle, and translating a new velocity command delivered to a motor for a wheel. If herein a motor is described as powering one wheel, it should be understood that the invention can be implemented to embodiments wherein more than one wheel powers one or more of the wheels; a first motor powers a first wheel and a second motor powers a second wheel, or any other useful configuration without departing from the spirit of the various embodiments described herein.

Figure 8:
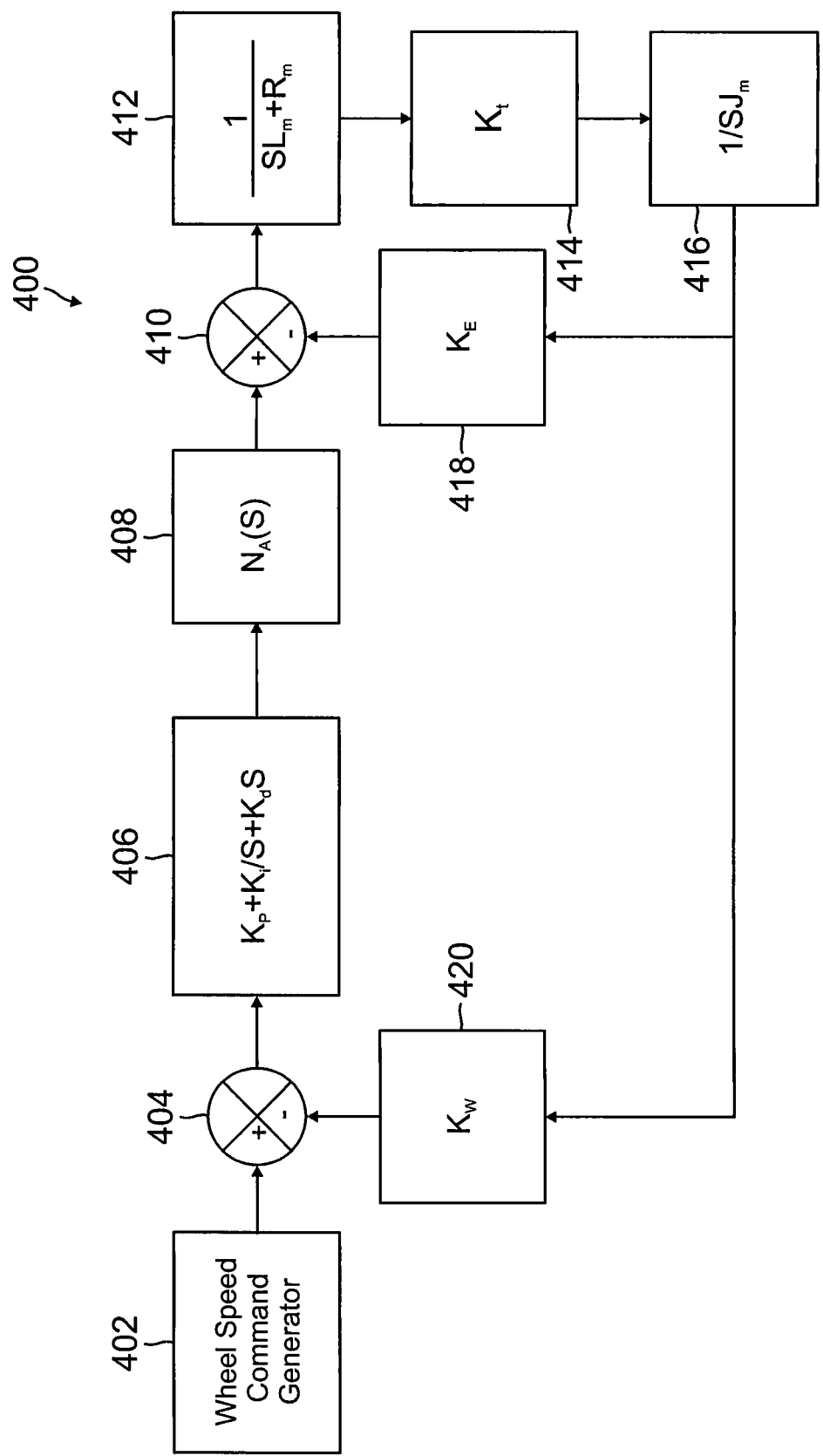
FIG. 8 is a plan view of a control system, according to a further embodiment of the present invention.

FIG. 8 shows a plan view of a control system, according to one embodiment of the present invention. The control system 400 represents a control system for a single wheel (e.g., wheel 340 from FIGS. 6-7). Wheel speed commands may originate from a wheel speed command generator 402. A second wheel could be controlled with a duplicate of the control system 400 shown in FIG. 8, with both wheel speed commands originating from the wheel speed command generator 402. A wheel speed error signal may be developed by taking a difference between a wheel speed command and actual detected wheel speed ("detected wheel speed"). For example, a summing function module 404 may receive an input from the wheel speed command generator 402 and another input from the actual wheel speed 420. A wheel speed error signal may be the result from summing the input from the wheel speed command generator 402 and the other input from the actual wheel speed 420. This wheel speed error signal may be delivered to a PID controller 406 (proportional plus integral plus derivative block). PID controller output may be applied to motor voltage. Variables may be defined as:
$K_p$=proportional gain
$K_i$=integral gain
$K_d$=derivative gain $L_m$=motor inductance
$J_m$=rotational moment of inertia
$K_t$=motor torque constant
$K_E$=motor back emf constant
$K_\omega$=wheel radius
$R_m$=motor DC resistance A motor may be pulse width modulated. A describing function represented by the block $N_A(S)$ 408 may represent a translation of the output from the PID controller 406. Motors may act like generators, thus spinning of motors may create a voltage (back emf). The motor-generated voltage may be subtracted from an applied voltage to result in an effective voltage, which is the difference between the applied voltage and the back emf. A second summing function module 410 may sum the difference between an applied armature voltage and the motor back emf to output an effective motor voltage. Effective voltage may be applied to motor inductance and resistance yields motor current, as shown in module 412. For permanent magnet DC motors the motor current multiplied by the torque constant yields motor torque, as shown regarding torque calculation module 414. At inertia yield module 416, motor torque applied to the motor loads rotational moment of inertia yields wheel speed. A motor back emf constant may be used in a module 418 to provide an input to the second summing function module 410. Implementation of the PID controller 406 may be in software in a microcontroller based design.

Figure 9:
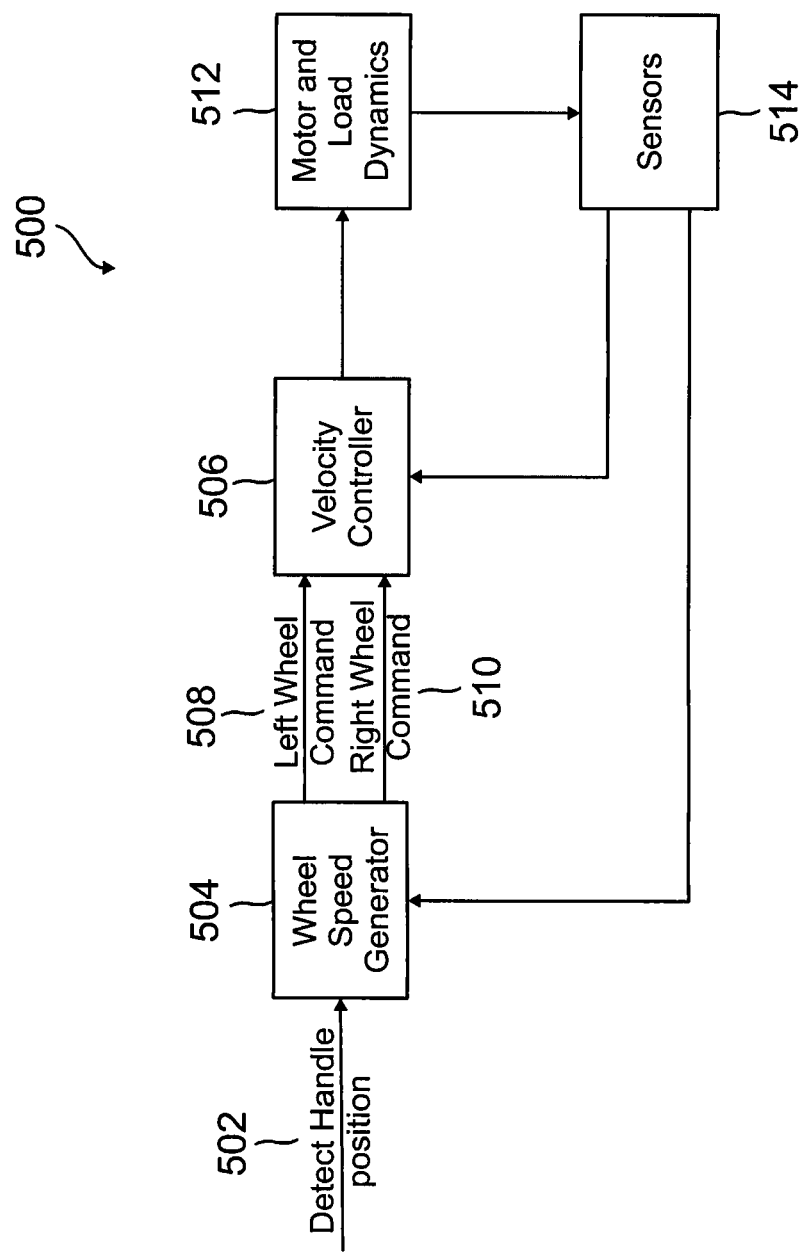
FIG. 9 is a flowchart depicting an exemplary method for implementing a control algorithm.

FIG. 9 is a flowchart depicting an exemplary method 500 for implementing a control algorithm. At step 502 the handle position may be detected and transmitted to a wheel speed generator 504. Commands for the left wheel 508 and the right wheel 510 may be calculated and transmitted from the wheel speed generator 504 to a velocity controller 506. The velocity controller 506 may communicate with a motor and load dynamics module 512 and sensors 514. Likewise, sensors 514 may communicate with the wheel speed generator 504, the velocity controller 506, and the motor and load dynamics module 512. Handle forces may be analyzed to determine whether a user is moving faster or slower than the current wheel speed. The data from such analysis may be combined with gyroscope angular velocity data to compute the new wheel speed command. The system may apply velocity error between speed command and wheel speed, wherein the velocity error is applied to a velocity controller (PID algorithm) to generate the voltage applied to the motors, one for each wheel.

A force sensor may be used to detect linear velocity. When a user pulls on a handle, the amount of pulling force exerted on the handle may be measured. If the velocity of a cooler exceeds the walking speed of a user, a pushing force may be generated, such as via motors engaged with wheels on the cooler. A control system may be designed to sum the pushing and pulling forces to zero. Any non-zero force on the handle may constitute an error signal that may then be translated to a new velocity command for propulsion by the motors.

The cooler may comprise a telescoping handle which is held centered by two springs, one on each side of a center position. Pulling on the telescoping handle may shift and unbalance the equilibrium of the spring forces to move the handle from its neutral position and extending the telescoping handle. Extending the handle may create a velocity command to one or more motors to increase the speed of the cooler. Pushing on the telescoping handle, such as when the cooler is moving at a higher speed than the user, may compress the telescoping handle to create a command to decrease propulsion speed of the motors.

Figure 10:
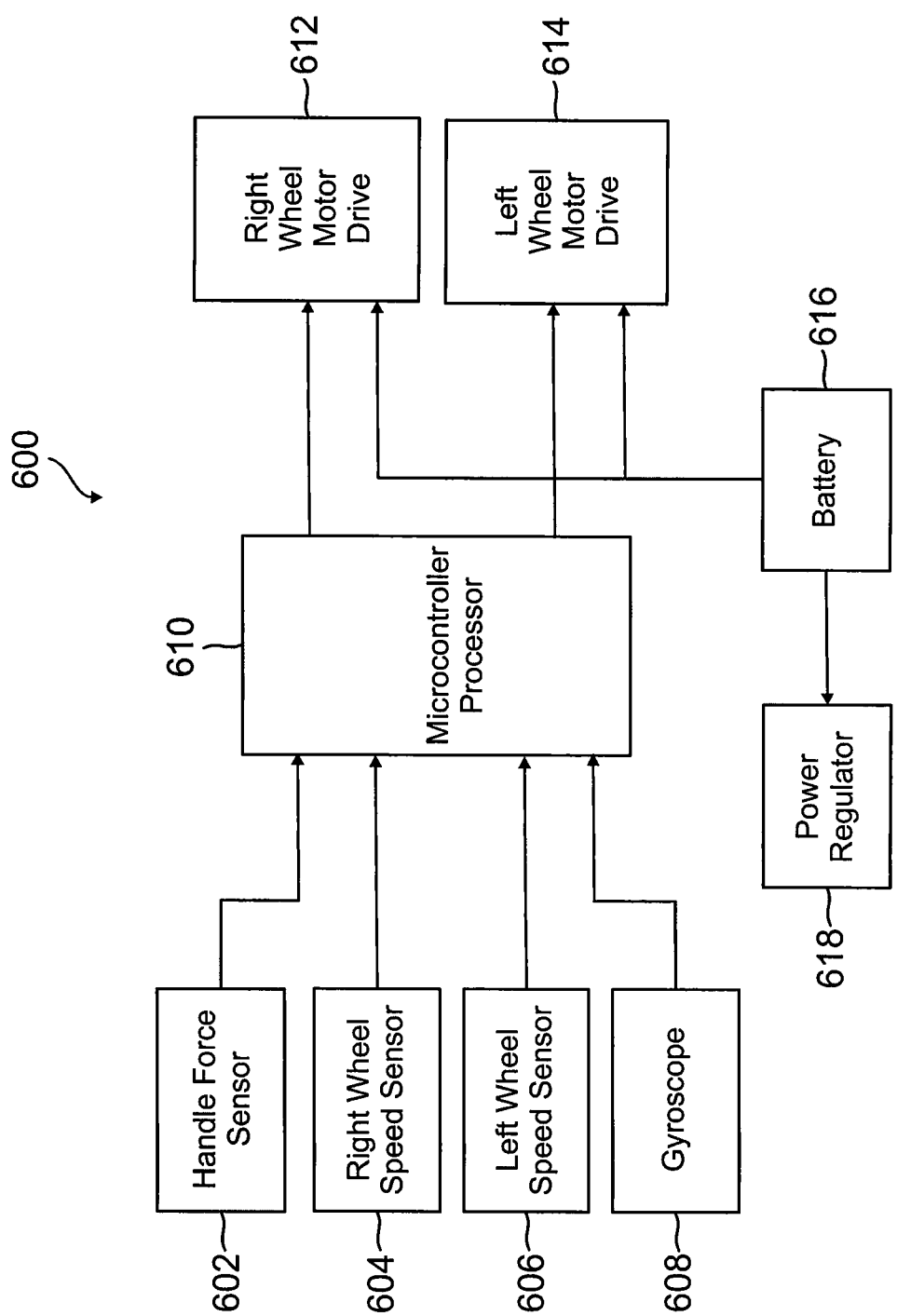
FIG. 10 is a schematic plan view of a system for controlling power assistance of wheeled coolers, according to yet a still further embodiment of the present invention.

Further detail is provided in FIG. 10, which depicts a processor, such as a microcontroller, with various sensor inputs. The system 600 may comprise sensors 602-608. Handle force sensor 602 may provide handle force input to processor 610. Right wheel speed sensor 604 may provide right wheel speed input to the processor 610 while left wheel speed input may be provided to processor 610 by left wheel speed sensor 606. The gyroscope sensor 608 may send data to processor 610. The applied motor voltages may be controlled by sensor inputs and generated right and left motor PWM signals. The right wheel motor drive 612 may execute the power assist from the calculated right wheel motor voltage for power assist to the right wheel. Similarly, the left wheel motor drive 614 may execute the power assist from the calculated left wheel motor voltage for power assist to the left wheel. A power supply, such as battery 616 may power the system 600 in coordination with a power regulator 618.

Figure 11:
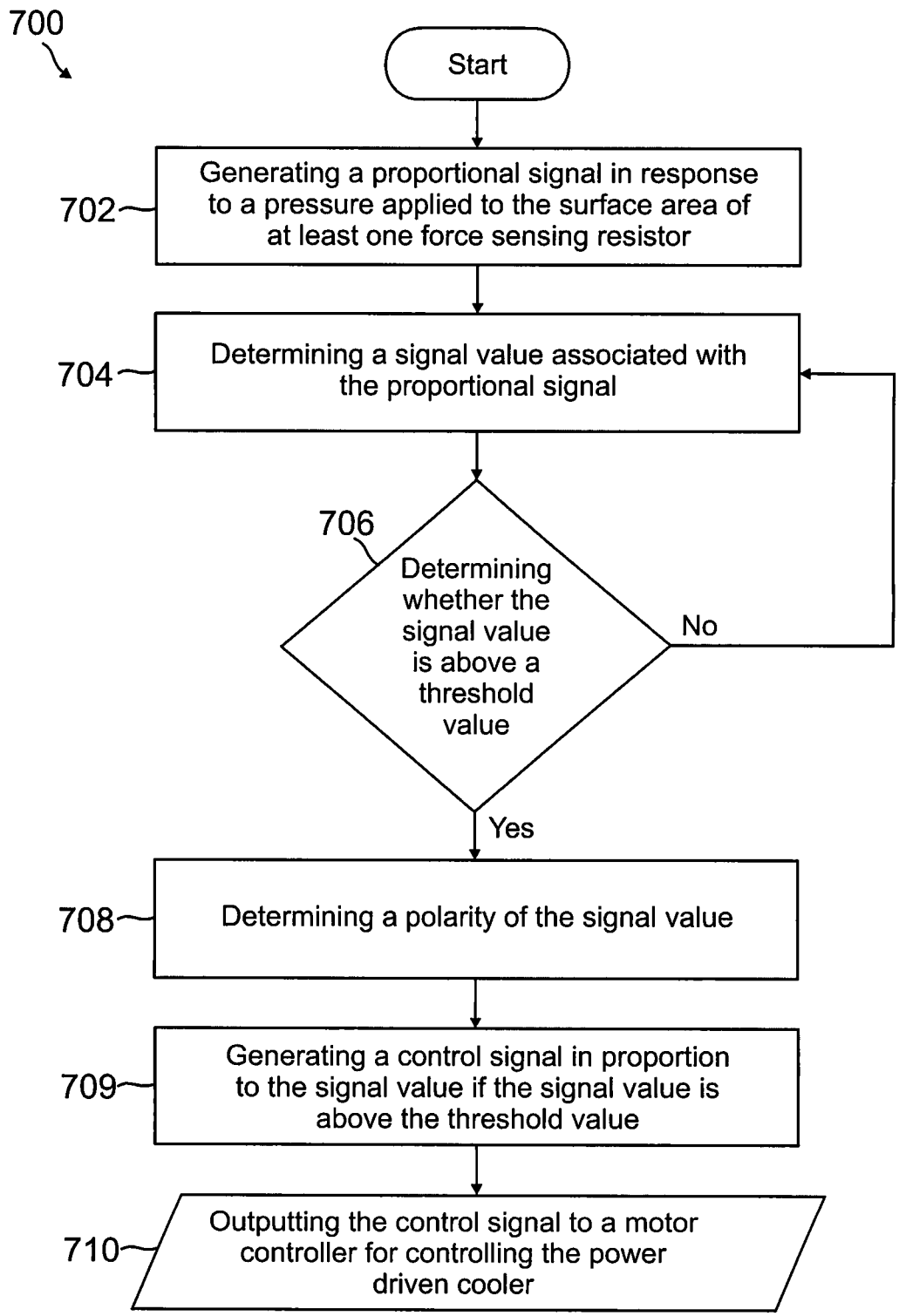
FIG. 11 shows a flowchart depicting an exemplary method for controlling signal responses in a system for power assistance for wheeled coolers, according to a still further embodiment of the present invention.

FIG. 11 shows a flowchart depicting an exemplary method for controlling signal responses in a system for power assistance for wheeled coolers. The diagram does not show syntax of any particular programming language. One may use the flowchart to manufacture circuits or to generate software algorithms to perform processing of the system 700. The flow may commence at block 702, where it generates a proportional signal in response to a pressure applied to the surface area of a sensing resistor. At block 704 a signal value associated with the proportional signal may be determined. At block 706 the signal value may be tested to determine whether the signal value is above a threshold value. If the signal value is not above the threshold value, logic may branch or loop back to block 704 to determine a signal value associated with the proportional signal. If the signal value is above a threshold value, logic may advance to block 708.

At block 708 a polarity of the signal value may be determined. At block 709 a control signal in proportion to the signal value may be generated, if the signal value is above the threshold value. At block 710, the control signal may be outputted to a motor controller for controlling the power assisted wheels.

In the flowchart, rectangular elements (e.g., 702, 704, 708, 709) denote "processing blocks" and represent computer software instructions or algorithms. The diamond shaped element (i.e., 706) represents a "decision block" and represents computer software instructions or algorithms which affect the execution of the computer software instructions represented by the processing blocks. Alternatively, the processing and decision blocks represent steps performed by functionally equivalent circuits such as a digital signal processor circuit or an application-specific integrated circuit (ASIC)

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

I claim:
1. An insulated cooler, comprising:
an outer liner including a bottom panel, a front panel, a rear panel, a left side panel, and a right side panel, forming a generally rectangular structure;

an inner liner within the outer housing, the inner liner including a front panel, a rear panel, a left side panel, and a right side panel, forming a generally rectangular structure;

an insulation space in between the outer liner and the inner liner;

a main lid for closing the insulated cooler;

a personal storage compartment within the main lid;

a handle coupled to the rear panel of the outer liner; and a plurality of wheels coupled to the insulated cooler;

a plurality of force-sensing sensors generating a proportional signal in response to sensed pressure;

a controller comprising at least one input for receiving the proportional signal and comprising logic to:

determine a signal value from the proportional signal;

determine whether the signal value is above a threshold value;

determine a polarity of the signal value;

generate a control signal in proportion to the signal value if the signal value is above the threshold value;

output the control signal to a motor controller for controlling at least one of the plurality of wheels; and wherein the plurality of force-sensing sensors include sensing resistors which include a contactable surface.

2. The insulated cooler of claim 1, wherein the force-sensing sensors include sensing resistors to sense forces in a forward direction, a reverse direction, a right direction, and a left direction respective of the insulated cooler.

3. The insulated cooler of claim 1, wherein the force-sensing sensors sense pressure within the handle.

4. The insulated cooler of claim 1, wherein a top lid covers a top of the personal storage compartment.

5. The insulated cooler of claim 1, wherein the controller generates a control signal by adding the signal value to a neutral value.

6. The insulated cooler of claim 1, wherein the controller generates a control signal by subtracting a signal value from a neutral value.

7. The insulated cooler of claim 1, further comprising a charging panel for wirelessly charging electronic devices situated within the personal storage compartment.

8. The insulated cooler of claim 1, further comprising a charging panel for wirelessly charging electronic devices not situated within the personal storage compartment.

9. The insulated cooler of claim 1, further comprising a charging panel for wirelessly charging electronic devices not in contact with the insulated cooler.

10. The insulated cooler of claim 1, further comprising a removable inner container nested within the insulated cooler between the main lid and the bottom panel of the outer liner.

11. The insulated cooler of claim 1, further comprising an entertainment module removably attached to the insulated cooler.

12. An insulated cooler, comprising:

an outer liner including a bottom panel, a front panel, a rear panel, a left side panel, and a right side panel, forming a generally rectangular structure;

an inner liner within the outer housing, the inner liner including a front panel, a rear panel, a left side panel, and a right side panel, forming a generally rectangular structure;

an insulation space in between the outer liner and the inner liner;

a main lid for closing the insulated container;

a personal storage compartment between the main lid and a main cooler compartment of the insulated cooler;

a top lid for closing the personal storage compartment;

an inner platform above the main cooler compartment and below the personal storage compartment for separating the main cooler compartment from the main lid;

a handle coupled to the rear panel of the outer liner; and a plurality of wheels coupled to the insulated cooler;

a plurality of sensors sensing forces within the handle, the sensors generating a proportional signal in response to sensed forces;

a controller comprising at least one input for receiving the proportional signal and comprising logic to:

hold the handle in a neutral position by springs on sides of a center position;

pull on the handle to shift the spring forces and move the handle from the center position and extending the handle;

extend the handle to create a velocity command to a motor to increase speed; and push on the handle to compress the handle to create a command to decrease propulsion speed.

13. The insulated cooler of claim 12, wherein the handle is a sliding handle.

14. The insulated cooler of claim 12, wherein the handle is a swivel handle.

15. The insulated cooler of claim 12, wherein the handle is a telescoping handle.

16. The insulated cooler of claim 12, further comprising a charging panel for wirelessly charging electronic devices situated within the personal storage compartment.

17. The insulated cooler of claim 12, further comprising a charging panel for wirelessly charging electronic devices not situated within the personal storage compartment.

18. The insulated cooler of claim 12, further comprising a charging panel for wirelessly charging electronic devices not in contact with the insulated cooler.

19. The insulated cooler of claim 12, further comprising a removable inner container nested within the insulated cooler between the main lid and the bottom panel of the outer liner.

20. The insulated cooler of claim 12, further comprising an entertainment module removably attached to the insulated cooler.

21. A system for providing power assistance to wheels, comprising:

a plurality of wheels coupled to at least one motor;

a plurality of force-sensing sensors generating a proportional signal in response to sensed pressure;

a controller comprising at least one input for receiving the proportional signal and comprising logic to:

determine a signal value from the proportional signal;

determine whether the signal value is above a threshold value;

determine a polarity of the signal value;

generate a control signal in proportion to the signal value if the signal value is above the threshold value; and output the control signal to a motor controller for controlling at least one of the plurality of wheels;

wherein the plurality of force-sensing sensors include sensing resistors which include a contactable surface.

22. The system of claim 21, wherein the force-sensing sensors include sensing resistors to sense forces in a forward direction, a reverse direction, a right direction, and a left direction.

23. The system cooler of claim 21, wherein the force-sensing sensors sense pressure within the handle.

24. The system of claim 21, wherein the controller generates a control signal by adding the signal value to a neutral value.

25. The system of claim 21, wherein the controller generates a control signal by subtracting the signal value from a neutral value.

26. A system for providing power assistance to wheels, comprising;
- a plurality of wheels coupled to a vehicle;
- a handle coupled to the vehicle;
- a plurality of sensors sensing forces within the handle, the sensors generating a proportional signal in response to sensed forces;
- a controller comprising at least one input for receiving the proportional signal and comprising logic to:
- determine a signal value from the proportional signal;
- hold the handle in a neutral position by springs on sides of a center position;
- pull on the handle to shift the spring forces and move the handle from the center position and extending the handle;
- extend the handle to create a velocity command to a motor to increase speed; and
- push on the handle to compress the handle to create a command to decrease propulsion speed;
- wherein the plurality of sensors include sensing resistors which include a contactable surface.

27. The system of claim 26, wherein the handle is a sliding handle.

28. The system of claim 26, wherein the controller generates a control signal by adding the signal value to a neutral value.

29. The system of claim 26, wherein the controller generates a control signal by subtracting the signal value from a neutral value.

* * * * *